3,267,076
PROCESS FOR THE POLYMERIZATION
OF FORMALDEHYDE
Takayoshi Ishii and Shotaro Sugiura, Ube-shi, Yamaguchi-ken, Japan, assignors to Ube Industries, Ltd., Ube-shi Yamaguchi-ken, Japan, a corporation of Japan
No Drawing. Filed June 27, 1963, Ser. No. 290,948
Claims priority, application Japan, July 3, 1962, 37/27,285
3 Claims. (Cl. 260—67)

This invention relates to the preparation of very tough high molecular weight polyoxymethylene by the polymerization of formaldehyde and more particularly to the preparation of such polyoxymethylene by said polymerization in the presence of the hereinafter defined specific chelate compound of a metal selected from the transition metals, Al, Cu or Zn.

It has been known that polyoxymethylene can be prepared by polymerization in the presence of many kinds of catalysts. For instance, formaldehyde can be polymerized in an inert solvent by using, as a catalyst, amines, organic phosphoric compounds, metal carbonyls (U.S.P. 2,828,286, U.S.P. 2,841,570, U.S.P. 2,734,889), onium compounds (B.P. 793,673), methylole derivative (CH—X—R), aluminum or alumina (U.S.P. 3,005,799) or sulfur compounds having a group of

The organometallic compounds of the metals of the 1st, 2nd and 3rd groups of the Periodic Table also are effective for said polymerization (U.S.P. 2,848,437). Also some compounds of the transition metals such as metal carbonyls of 8th groups (U.S.P. 2,734,889), metallic salts of nickel, manganese or iron (Belg. P. 608,221) are known to be effective.

Most of said known catalysts can produce considerably high molecular weight polyoxymethylene but these polymers are found wanting in their heat stability and toughness.

Therefore it is one of the objects of this invention to provide a process for the preparation of very tough high molecular weight polyoxymethylene.

It is another object of this invention to provide high quality polyoxymethylene which can be conveniently used in various applications as thermoplastics.

Other objects and advantages will be apparent from the following descriptions.

According to this invention, formaldehyde can be polymerized to high molecular weight polyoxymethylene by continuously introducing gaseous formaldehyde into an inert solvent which contains a catalyst characterized by metal chelate compounds having the general formula:

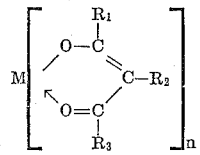

where M is a metal selected from the group consisting of the transition meals, Al, Cu and Zn; $R_1$ and $R_3$ are radicals selected from the group consisting of alkyl-, aryl-, alkoxy-, thienyl- and furyl- radicals having 1 to 10 carbon atoms and halogen-substituted compounds thereof; $R_2$ is hydrogen; and $n$ is an integer of from 1 to 4.

The term "metal chelate compounds" is used herein in accordance with the definition in the "Chemistry of the Metal Chelate Compounds" (New York, Prentice-Hall Inc., 1952), by A. E. Martell and M. Calvin. The above metal chelate compounds to be used in this invention have the structure in which β-diketone derivatives are coordinate-bonded to the metal at oxygen.

The transition metals are not only the metals of the 8th position of the Periodic Table but also the 4, 5, 6 and 7th positions of the same table. They include Co, Fe, Ti, V, Cr, Mn, Mo, Pd, Pt.

As a chelating agent to prepare the above metal chelate compounds, β-diketone derivatives such as acetylacetone, methylacetylacetone, trifluorocetylacetone, hexafluoroacetylacetone, benzoylacetone, benzoyltrifluoroacetone, dibenzoylmethane, β-naphthoyltrifluoroacetone, furoylacetone, furoyltrifluoroacetone, thienoylacetone, thienoylbenzylacetone, dithienoylmethane, 2 - thienoyl-2 - fluoromethane, 1-silylbutadione-1,3, and 1,3-disilylpropanedione-1,3 can be used.

The metal chelate compounds, which can be preferably used in this invention, include cobalttriacetylacetonate, vanadiumtriacetylacetonate, nickel - diacetylacetonate, irontriacetylacetonate chrometriacetylacetonate, manganesetriacetylacetonate, titanium - oxodiacetylacetonate, molybdenumdioxodiacetylacetonate, paladiumacetylacetonate, and platinumacetylacetonate.

The metal chelate compounds can be used either solely or in a mixture thereof. It is also possible to use said catalyst as a main catalyst together with other known organometallic compounds such at triethylaluminium as a co-catalyst.

Advantages of this invention are as follows:

(1) The toughness of the film of the polyoxymethylene obtained according to the invention is much higher than that of known polyoxymethylene produced by using known catalysts.

(2) The molecular weight of the polyoxymethylene obtained according to the invention is very high. Accordingly, the heat stability of such polyoxymethylene is very excellent.

(3) Even if a considerable amount of impurities are present in the monomers, high molecular weight polymers having high toughness can be obtained.

(4) Even if the catalyst is used together with conventional organometallic compounds, we can prepare polymers which are tough and have high molecular weight and high thermal stability can be obtained.

(5) The polymerization rate is satisfactorily rapid and the polymer yield is very high.

(6) Since our catalyst is inherently fully soluble in the reaction solvent, it is most convenient for continuous industrial production of the polymer.

In this invention, it is desirable to effect polymerization under substantially anhydrous conditions. However, according to this invention, high molecular weight polyoxymethylene having high toughness can be obtained even in the presence of polar impurities such as methanol in the amount of as much as 1%, while it is not possible to obtain such polyoxymethylene in the presence of such impurities in cases using conventional catalysts.

Effective amount of the catalyst may vary from $1 \times 10^{-5}$ to $1 \times 10^{-2}$ moles, preferably from $2 \times 10^{-5}$ to $1 \times 10^{-4}$, per 1 mole of formaldehyde.

Effective catalyst concentration may vary from 0.0001% to 1%, preferably from 0.002% to 0.01%, based on reaction solvent.

The inert solvents to be used in this invention are inert for formaldehydes and include solvents such as n-heptane, n-hexane, cyclohexane, tetraline, toluene, benzene, carbon tetrachloride and petroleum benzine and mixtures thereof.

If desired, a dispersion agent may be used but this is not essential.

Polymerization may be effected at a temperature of −75° C. to +80° C., preferably −15° C. to +40° C. and at atmospheric or higher pressure.

As a suitable condition, the introduction rate of gaseous monomer should correspond to the rate of polymerization.

Satisfactory results such as a yield of approximately 90% can be attained in such conditions.

Hereinafter the degree of heat stabilization is indicated by the thermal decomposition rate of polyoxymethylene as in U.S.P. 2,768,994. That is, the value of the reaction rate constant for thermal degradation at 222° C. ($K_{222}$) is determined by placing about 1 gram of the polymer to be tested in a small ampule open to the ambient atmosphere through a single capillary. The ampule is evacuated, filled with nitrogen and then evacuated a second time, and filled with nitrogen a second time. The ampule is then suspended from a balance in a vapor bath at 222° C. The vapor has been obtained by boiling methyl salicylate and allowing the vapor at 222° C. to surround the ampule. As the polymer in the ampule degrades into formaldehyde vapor, the weight of the remaining solid polymer is recorded at periodic intervals, beginning at the moment the methyl salicylate vapor reaches the top of the ampule. These values are then plotted as the logarithm of the weight or weight percent of undergraded polymer vs. the corresponding time. The plotted curve normally defines a line which is essentially straight throughout the major portion of the degradation period. The value of the reaction rate constant for thermal degradation, ($K$) is 2.303 times the slope of the plotted line. The units of ($K$) are reciprocal minutes if the time ($t$) is in minutes, and therefore a ($K$) of 0.01 reciprocal minutes is equivalent to 1% per minute and represents polymer degradation as 1% of the polymer weight degraded per minute of reaction.

The molecular weights of polyoxymethylene are represented by the relative viscosity in 0.5% p-chlorphenol (containing 2% of a α-pinene) at 60° C. The viscosity is indicated as $\{\eta\}0.5$. Generally, the larger the value of $\{\eta\}0.5$ is, that is, the higher the molecular weight of polymer, the smaller the value of $K_{222}$ becomes, that is, the higher the thermal stability of polymer increases.

A "degree of toughness" is determined as in U.S.P. 2,768,992. That is, the degree of toughness is determined by subjecting a film of 0.05 mm. in thickness to a series of manual creasing actions, after the film has been aged by maintaining it at 150° C. for 7 days in a circulating air oven, or its equivalent. The film is removed from the oven, and, without further treatment, is subjected to manual creasing actions. A single creasing cycle consists in folding the film through 180° C. and creasing, and then folding in the reverse direction through 360° C. and creasing again to complete one cycle. The number of creasing cycles which the film withstands before breaking at the crease line is referred to as the "degree of toughness."

The present invention is illustrated by but not limited to the following examples.

*Example 1*

The inside of a reaction vessel was substituted with $N_2$ before reaction. Into the reaction vessel were introduced 0.007 g. (0.02 milli-mole) of cobalttriacetylacetonate as a catalyst dissolved in 400 cc. of practically water-free n-heptane as an inert solvent. Gaseous monomeric formaldehyde, which has been obtained by pyrolyzing α-polyoxymethylene, was introduced into the reaction vessel through 8 U-shaped traps kept at −15° C. and through a flow meter. The reaction medium was then agitated and monomeric formaldehyde gas was introduced into said reaction vessel at the rate of 0.1 g. per minute and white powder polymer started to form. The reaction temperature was kept at 25° C. After the formaldehyde monomer was continuously introduced over a period of 300 minutes, the polymer produced was filtered and washed several times by benzene and methanol, and dried over a period of 3 hours at the reduced pressure. Thus, about 30 g. of polymer of white bulky powder were obtained. Polymer yield was nearly 100%. $\{\eta\}0.5$ was 6.4. $\{\eta\}$ was 10. $K_{222}$ was 0.9%/minute. The degree of toughness was above 1,000. After acetylation of polymer by known methods, the polymer had very high heat stability and its $K_{222}$ was 0.2. The degree of toughness of acetylated polymer was above 1,000.

*Example 2*

Polymerization was carried out using 0.038 g. (0.1 milli-mole) of cobalttriacetylacetonate, the other conditions being the same as in Example 1. 30 g. of polymer were obtained from 30 g. of formaldehyde monomer and polymer yield was 100%. $\{\eta\}0.5$ was 5.8. $K_{222}$ was 1.2. The degree of toughness of produced polymer was above 1,000.

*Example 3*

Polymerization was carried out using 0.007 g. of cobalttriacetylacetonate as the main catalyst and 0.04 milli-mole of triethylaluminium as the co-catalyst under the same other conditions as in Example 1. Polymer yield was 98%. $\{\eta\}0.5$ was 2.6 $K_{222}$ was 0.9. The degree of toughness of acetylated polymer was above 1,000.

*Example 4*

Polymerization was carried out under the same conditions as in Example 1 except at a temperature of −10° C. Polymer yield was 98%. $\{\eta\}0.5$ was 6.0. $K_{222}$ was 1.1. The degree of toughness of acetylated polymer was above 1,000.

*Example 5*

Polymerization was carried out under the same conditions as in Example 1 except with the addition of 0.4 cc. of methanol. After 300 minutes, 24 g. of polyoxymethylene was obtained. Polymer yield was 80%. $\{\eta\}0.5=3.0$, $K_{222}$ was 1.7. The degree of toughness was above 1,000.

*Example 6*

Polymerization was carried out under the same conditions as in Example 1 except using 400 cc. of benzene instead of n-heptane as the inert solvent. Polymer yield was 97%. $\{\eta\}0.5$ was 2.5. $K_{222}$ was 1.7. The degree of toughness was above 500.

*Example 7*

Polymerization was carried out under the same conditions as in Example 1 except using 0.007 g. (0.02 milimole) of vanadiumtriacetylacetonate instead of the cobalt compound. After 300 minutes, 28 g. of polyoxymethylene was obtained. Polymer yield was about 94%. $\{\eta\}0.5$ was 3.4. $K_{222}$ was 1.0. When the obtained polymer was acetylated, the yield was 95% and the degree of toughness was above 1,000 and $K_{222}$ was 0.2.

*Example 8*

Polymerization was carried out under the same conditions as in Example 7 except using carbontetrachloride as the inert solvent instead of n-heptane. Polymer yield was 98%. $\{\eta\}0.5$ was 2.9. $K_{222}$ was 1.3. When the obtained polymer was acetylated, the yield was 100% and the degree of toughness was above 1,000.

*Examples 9–24*

Polymerization was carried out under the same conditions as in Example 1 except using, instead of cobalttriacetylacetonate, the catalysts in the following Table I, which table also shows the results of the said polymerization.

TABLE I

| Example No. | Catalyst | Polymer Yield | $\{\eta\}0.5$ | $K_{222}$ | Degree of Toughness, Above— |
|---|---|---|---|---|---|
| 9 | Chrometriacetylacetonate | 93 | 3.8 | 1.2 | 1,000 |
| 10 | Irontriacetylacetonate | 95 | 2.8 | 1.1 | 1,000 |
| 11 | Molybedenum-dioxo-diacetylacetonate | 98 | 3.2 | 1.0 | 1,000 |
| 12 | Titanium-oxo-diacetylacetonate | 95 | 2.8 | 1.3 | 1,000 |
| 13 | Palladiumdiacetylacetonate | 92 | 3.5 | 1.1 | 1,000 |
| 14 | Platinumdiacetylacetonate | 93 | 3.0 | 1.0 | 1,000 |
| 15 | Nickeldiacetylacetonate | 95 | 2.7 | 1.3 | 1,000 |
| 16 | Manganesetriacetylacetonate | 98 | 3.1 | 1.0 | 1,000 |
| 17 | Cobaltdithienoyltrifluoroacetonate | 80 | 1.2 | 1.5 | 1,000 |
| 18 | Cobaltdifuroyltrifluoroacetonate | 85 | 2.0 | 1.4 | 1,000 |
| 19 | Cobaltdibenzoylacetonate | 92 | 2.2 | 1.2 | 1,000 |
| 20 | Cobaltdiacetoaceticacidethylate | 85 | 2.5 | 1.2 | 1,000 |
| 21 | Cupperdiacetoaceticacidethylate | 96 | 4.3 | 1.1 | 1,000 |
| 22 | Cupperdiacetylacetonate | 98 | 4.3 | 1.1 | 1,000 |
| 23 | Aluminumtriacetylacetonate | 93 | 1.2 | 0.9 | 1,000 |
| 24 | Zincdiacetylacetonate | 98 | 1.8 | 1.2 | 1,000 |

REFERENCE EXAMPLES

| Example No. | Catalyst | Polymer Yield | $\{\eta\}0.5$ | $K_{222}$ | Degree of Toughness, Above— |
|---|---|---|---|---|---|
| 1 | Triethylaluminium | 43 | 1.9 | 2.6 | 0 |
| 2 | Diethylzinc | 86 | 1.8 | 2.4 | 0 |

What we claim is:

1. A process for polymerizing formaldehyde to high molecular weight polyoxymethylene which comprises contacting gaseous formaldehyde monomer with a catalyst constituted by a metal chelate compound having the formula:

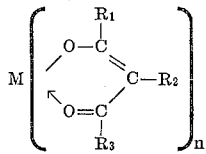

wherein M is a metal selected from the group consisting of the transition metals, Al, Cu and Zn; $R_1$ and $R_3$ are radicals selected from the group consisting of alkyl-, aryl-, alkoxy-, thienyl- and furyl-radicals containing one to ten carbon atoms and halogen-substituted compounds thereof; $R_2$ is hydrogen and $n$ is an integer of from one to four, in an inert solvent as a reaction solvent, said gaseous formaldehyde monomer being introduced continuously into said inert solvent dissolving said catalyst.

2. A process as claimed in claim 1 wherein said gaseous formaldehyde is contacted with the catalyst at a temperature between −75° C. to 80° C.

3. A process according to claim 1, wherein the amount of the catalyst is within the range of from $1\times10^{-5}$ to $1\times10^{-2}$ moles per 1 mole of formaldehyde and the concentration of the catalyst in the reaction solvent is within the range of from 0.0001% to 1% based on the reaction solvent.

References Cited by the Examiner

UNITED STATES PATENTS 2,734,889   2/1956   Starr _____ 260—67

OTHER REFERENCES

Kambara, Journal of Polymer Science, 51, S7–S10, 1961.

SAMUEL H. BLECH, *Primary Examiner.*

WILLIAM H. SHORT, *Examiner.*

R. T. LYON, *Assistant Examiner.*